United States Patent
Han et al.

(10) Patent No.: US 9,596,168 B2
(45) Date of Patent: Mar. 14, 2017

(54) COMMUNICATION METHOD FOR ACCESS POINT AND TERMINAL FOR RETRANSMISSION OF MULTICAST PACKET IN NETWORK INCLUDING ACCESS POINT AND PLURALITY OF TERMINALS

(71) Applicant: Samsung Electronics Co., Ltd., Suwon-si (KR)

(72) Inventors: Kwang Hoon Han, Suwon-si (KR); Kyung Hun Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 351 days.

(21) Appl. No.: 14/172,068

(22) Filed: Feb. 4, 2014

(65) Prior Publication Data

US 2015/0009989 A1    Jan. 8, 2015

(30) Foreign Application Priority Data

Jul. 4, 2013    (KR) ........................ 10-2013-0078401

(51) Int. Cl.
| | | |
|---|---|---|
| *H04J 3/18* | (2006.01) | |
| *H04L 12/28* | (2006.01) | |
| *H04L 12/761* | (2013.01) | |
| *H04W 40/22* | (2009.01) | |
| *H04L 12/18* | (2006.01) | |
| *H04L 12/24* | (2006.01) | |
| *H04L 12/26* | (2006.01) | |
| *H04W 88/04* | (2009.01) | |

(52) U.S. Cl.
CPC .......... *H04L 45/16* (2013.01); *H04L 12/1868* (2013.01); *H04L 41/30* (2013.01); *H04L 43/0847* (2013.01); *H04L 43/50* (2013.01); *H04W 40/22* (2013.01); *H04L 12/1881* (2013.01); *H04W 88/04* (2013.01)

(58) Field of Classification Search
CPC .................................................... H04W 40/22
See application file for complete search history.

(56) References Cited

U.S. PATENT DOCUMENTS

| | | | |
|---|---|---|---|
| 7,532,623 B2 | 5/2009 | Rosenzweig et al. | |
| 8,023,433 B2 | 9/2011 | Andou et al. | |
| 8,081,628 B2 | 12/2011 | Wu et al. | |
| 8,139,501 B2 | 3/2012 | Andou et al. | |

(Continued)

FOREIGN PATENT DOCUMENTS

| | | |
|---|---|---|
| EP | 1 146 683 A2 | 10/2001 |
| JP | 2002-141856 A | 5/2002 |

(Continued)

OTHER PUBLICATIONS

International Search Report mailed Apr. 15, 2014 in counterpart International Application No. PCT/KR2014/000448 (3 pages, in English).

*Primary Examiner* — Jutai Kao
(74) *Attorney, Agent, or Firm* — NSIP Law

(57) ABSTRACT

A communication method of an access point (AP) for retransmission of a multicast packet in a network including the AP and terminals, includes selecting a candidate terminal to be used to retransmit the multicast packet, from the terminals, and retransmitting the multicast packet, using the candidate terminal.

25 Claims, 19 Drawing Sheets

(56) References Cited

U.S. PATENT DOCUMENTS

| | | | |
|---|---|---|---|
| 9,210,731 B2* | 12/2015 | Wentink | H04W 76/023 |
| 2001/0049291 A1 | 12/2001 | Sato et al. | |
| 2002/0051425 A1 | 5/2002 | Larsson | |
| 2003/0093526 A1* | 5/2003 | Nandagopalan | H04L 12/5695 709/225 |
| 2007/0127421 A1* | 6/2007 | D'Amico | H04W 72/005 370/338 |
| 2008/0052779 A1* | 2/2008 | Sinha | H04L 63/1441 726/22 |
| 2009/0028086 A1* | 1/2009 | Tay | H04W 40/22 370/315 |
| 2010/0031108 A1 | 2/2010 | Peeters | |
| 2011/0051651 A1 | 3/2011 | Wu et al. | |
| 2012/0218926 A1* | 8/2012 | Wang | H04W 52/0216 370/311 |
| 2012/0258759 A1* | 10/2012 | Smadi | H03G 3/3052 455/522 |
| 2012/0307685 A1* | 12/2012 | Kim | H04W 48/16 370/255 |
| 2014/0056209 A1* | 2/2014 | Park | H04W 88/04 370/315 |
| 2014/0119272 A1* | 5/2014 | Wong | H04W 40/04 370/315 |
| 2014/0140265 A1* | 5/2014 | Zhang | H04B 7/15507 370/315 |
| 2014/0171062 A1* | 6/2014 | Fallgren | H04W 40/22 455/422.1 |

FOREIGN PATENT DOCUMENTS

| | | |
|---|---|---|
| JP | 2002-314604 A | 10/2002 |
| KR | 10-2004-0033664 A | 4/2004 |
| KR | 10-2007-0083027 A | 8/2007 |
| KR | 10-2008-0047008 A | 5/2008 |

* cited by examiner

COMMUNICATION METHOD FOR ACCESS POINT AND TERMINAL FOR RETRANSMISSION OF MULTICAST PACKET IN NETWORK INCLUDING ACCESS POINT AND PLURALITY OF TERMINALS

CROSS-REFERENCE TO RELATED APPLICATION

This application claims the benefit under 35 USC 119(a) of Korean Patent Application No. 10-2013-0078401, filed on Jul. 4, 2013, in the Korean Intellectual Property Office, the entire disclosure of which is incorporated herein by reference for all purposes.

BACKGROUND

1. Field

The following description relates to a communication method for an access point (AP) and a terminal for retransmission of a multicast packet in a network including the AP and a plurality of terminals.

2. Description of Related Art

In using various services and applications using multicast, a packet is transmitted to a terminal through a wireless channel, and therefore, a packet error is determined according to a channel state of the terminal. Generally, in a wired channel environment, it is presumed that almost all packets are transmitted without an error, causing only a difference in transmission rate according to packet paths. Therefore, loss of packets is not much considered. However, the wireless channel causes a packet error, and an error type or pattern is varied. Therefore, a method of correcting the packet error and a feedback method may be determined according to patterns of the packet error. The packet error may restrict a multicast transmission range in the wireless channel.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a communication method of an access point (AP) for retransmission of a multicast packet in a network including the AP and terminals, includes selecting a candidate terminal to be used to retransmit the multicast packet, from the terminals, and retransmitting the multicast packet, using the candidate terminal.

The communication method may further include determining different data rates to be used to select the candidate terminal, and transmitting, to the terminals, channel probe messages having the different data rates.

The selecting may include transmitting, to the terminals, a request message requesting the terminals to retransmit the multicast packet.

The request message may include a message type of the request message, or a size of a contention window to be used in a contention period (CP) in which the candidate terminal contends for the retransmission of the multicast packet, or an expiration timer informing whether the CP is expired, or a virtual carrier sense value notifying other terminals other than the candidate terminal to restrain use of channels, or any combination thereof.

The selecting may include receiving, from the candidate terminal, a response message responding to the request message, and selecting the candidate terminal based on the response message.

The communication method may further include broadcasting, to the terminals, an allocation message informing a result of the selecting.

The allocation message may include a message type of the allocation message, or an identifier of the candidate terminal, or a priority of the candidate terminal, or any combination thereof.

The communication method may further include determining a priority of the candidate terminal, and transmitting, to the candidate terminal, a trigger message including information for the retransmission of the multicast packet that is determined based on the priority.

A non-transitory computer-readable storage medium may store a program including instructions to cause a computer to implement the method.

In another general aspect, a communication method of a terminal for retransmission of a multicast packet in a network including an access point (AP) and terminals, includes receiving, from the AP, channel probe messages having different data rates to be used to select, from the terminals, a candidate terminal to be used to retransmit the multicast packet, and setting a maximum data rate based on a data rate of a decodable channel probe message among the channel probe messages. The communication method further includes determining the terminal as the candidate terminal based on whether the maximum data rate corresponds to a data rate of the candidate terminal that is included in the decodable channel probe message.

The communication method may further include determining whether the channel probe messages include the decodable channel probe message.

The channel probe message may include a message type of the channel probe message, or a data rate of transmitting data included in the channel probe message, or the data rate of the candidate terminal, or a window size used in a contention period of the candidate terminal, or the data, or any combination thereof.

The communication method may further include receiving, from the AP, a request message requesting the terminals to retransmit the multicast packet.

The request message may include a message type of the request message, or a size of a contention window (CW) to be used in a contention period (CP) in which the candidate terminal contends with other candidate terminals for the retransmission of the multicast packet, or an expiration timer informing whether the CP is expired, or a virtual carrier sense value notifying other terminals other than the candidate terminal to restrain use of channels, or any combination thereof.

The communication method may further include waiting until the CP is expired, and restraining use of the channels, based on the virtual carrier sense value in response to the terminal being the determined as another terminal other than the candidate terminal.

The communication method may further include setting the size of the CW as a CW value of the terminal in response to the terminal being determined as the candidate terminal, and determining a backoff counter value based on the size of the CW.

The communication method may further include transmitting, to the AP, a response message responding to the request message through the contention with the other candidate terminals.

The response message may include a message type of the response message, or an identifier of the candidate terminal, or status information of the candidate terminal that is determined based on the received request message, or any combination thereof.

The communication method may further include receiving, from the AP, an allocation message informing a result of the selecting, the allocation message including a message type of the allocation message, or an identifier of the candidate terminal, or a priority of the candidate terminal, or any combination thereof.

The communication method may further include receiving, from the AP, a trigger message informing the candidate terminal of a start of a retransmission period of the multicast packet, and including information for the retransmission of the multicast packet that is determined based on a priority of the candidate terminal, determining whether the terminal is included in a retransmission list of the trigger message, and retransmitting the multicast packet according to the priority, based on a result of the determining.

The trigger message may include a message type of the trigger message, or a number of candidate terminals participating in the retransmission of the multicast packet, or an expiration time of the retransmission period of the multicast packet, or a threshold of retransmission power to be used by the candidate terminal to determine whether to retransmit the multicast packet, or threshold activation information indicating whether to use the threshold of the retransmission power, or an ID of the candidate terminal, or a backoff counter value of the candidate terminal, or any combination thereof.

The retransmitting of the multicast packet may include determining whether a channel in which the multicast packet is retransmitted is in an idle state in response to the terminal being determined to be included in the retransmission list, and retransmitting the multicast packet based on the backoff counter value in response to the channel being determined to be in the idle state.

The communication method may further include stopping the retransmission of the multicast packet in response to the channel being determined to be not in the idle state, and transmission power of a currently received packet being greater than or equal to the threshold of the retransmission power.

In still another general aspect, an access point includes a control unit configured to determine different data rates, a transmission unit configured to transmit, to terminals, channel probe messages having the different data rates, and a selection unit configured to select, from the terminals, a candidate terminal to be used to retransmit a multicast packet, based on a response message transmitted from the candidate terminal based on the channel probe messages.

In yet another general aspect, a terminal includes a transmission unit configured to set a data rate of the terminal based on a data rate of a decodable channel probe message among channel probe messages having different data rates, the channel probe messages being received from an access point. The terminal further includes a control unit configured to determine the terminal as a candidate terminal to be used to retransmit a multicast packet based on whether the data rate of the terminal is equal to a data rate of the candidate terminal that is included in the decodable channel probe message.

Other features and aspects will be apparent from the following detailed description, the drawings, and the claims.

Figure 1:
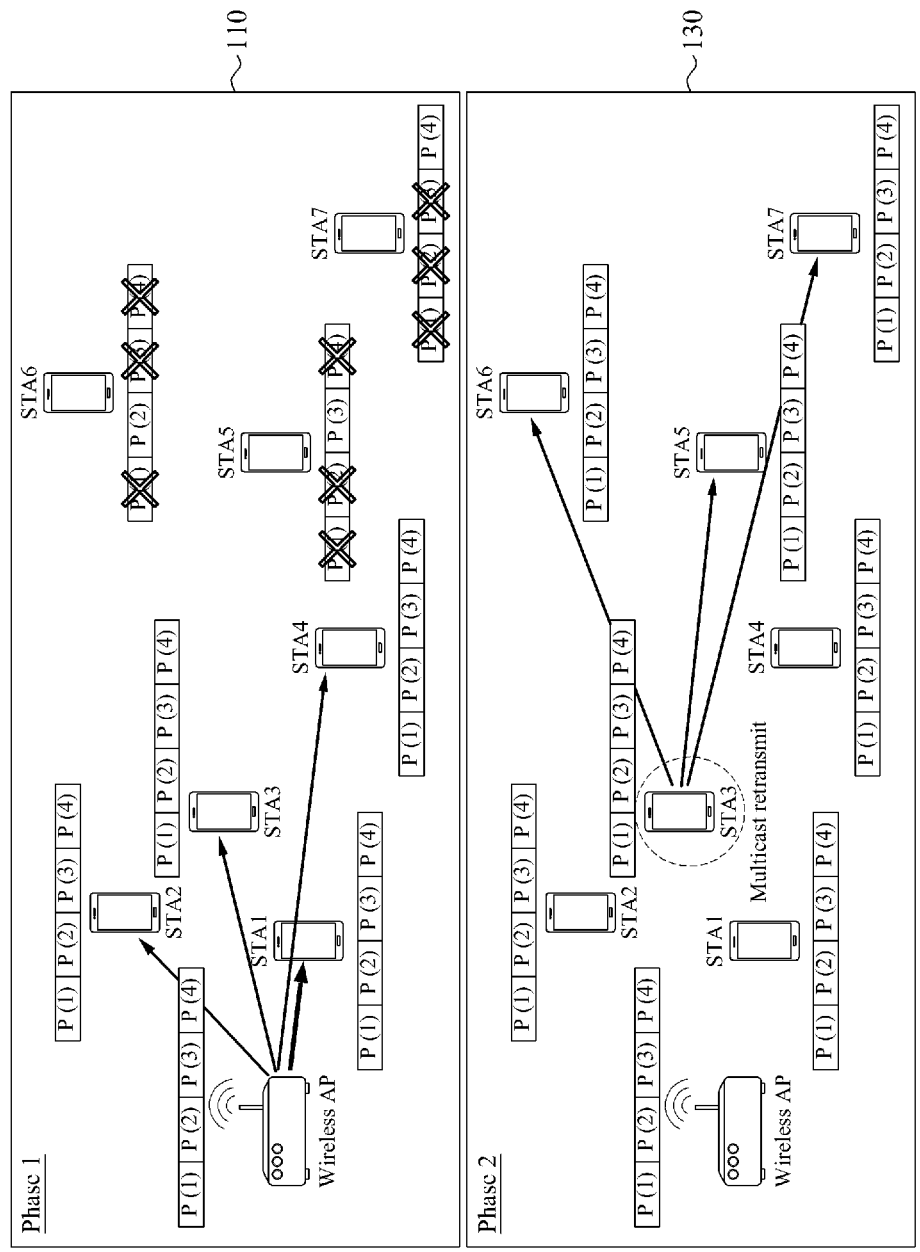
FIG. 1 is a diagram illustrating an example of an operational concept of an access point (AP) and a terminal for retransmission of a multicast packet.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

In the following description, the term 'terminal' may be understood as including various customer devices having a communication function, including a user terminal, such as a smart phone, a smart TV, a personal computer (PC), a notebook, a robot cleaner, and/or other devices known to one of ordinary skill in the art. The term 'access point (AP)' may refer to a transmission subject transmitting a multicast packet wired or wirelessly. The term 'AP' may be understood as also including various network entities or devices capable of performing same or similar functions to the AP, besides the AP.

FIG. 1 illustrates an example of an operational concept of an AP and a terminal for retransmission of a multicast packet. Referring to a phase 1 110 of FIG. 1, a process of transmitting the multicast packet in a wireless system is illustrated. A wireless AP transmits four packets P(1), P(2), P(3), and P(4) to seven terminals STA1, STA2, STA3, STA4, STA5, STA6, and STA7. According to a channel state, some packets generate an error or are lost in some of the terminals, for example, in STA5, STA6, and STA7.

When a packet error is generated, the AP, which is a multicast subject, may determine whether the terminals have received packets through feedback, and try retransmission until multicast with respect to all of the terminals STA1, STA2, STA3, STA4, STA5, STA6, and STA7 is successful. By a high probability, the retransmission may be determined by a terminal having a worst channel state, that is, the terminal having a lowest transmission rate among the terminals STA1, STA2, STA3, STA4, STA5, STA6, and STA7 participating in the multicast. Although most of the terminals are in a good channel state, even a single terminal having a poor channel state, that is, the lowest transmission rate, may affect entire multicast efficiency.

In one example, instead of the AP covering multicast of all of the terminals STA1, STA2, STA3, STA4, STA5, STA6, and STA7, an intermediate terminal may be entrusted with retransmission of the multicast packet, so that the multicast packet efficiency is increased. Referring to a phase 2 130 of FIG. 1, the terminal 3 STA3 is entrusted with retransmission of the multicast packet of the AP, and retransmits the multicast packet to the terminals STA5, STA6, and STA7 generating packet errors. The terminals STA5, STA6, and STA7 receiving the multicast packet transmitted by the terminal 3 STA3 restores the packet errors. The terminal 3 STA3 may retransmit the multicast packet by a higher transmission rate than the AP.

Figure 2:
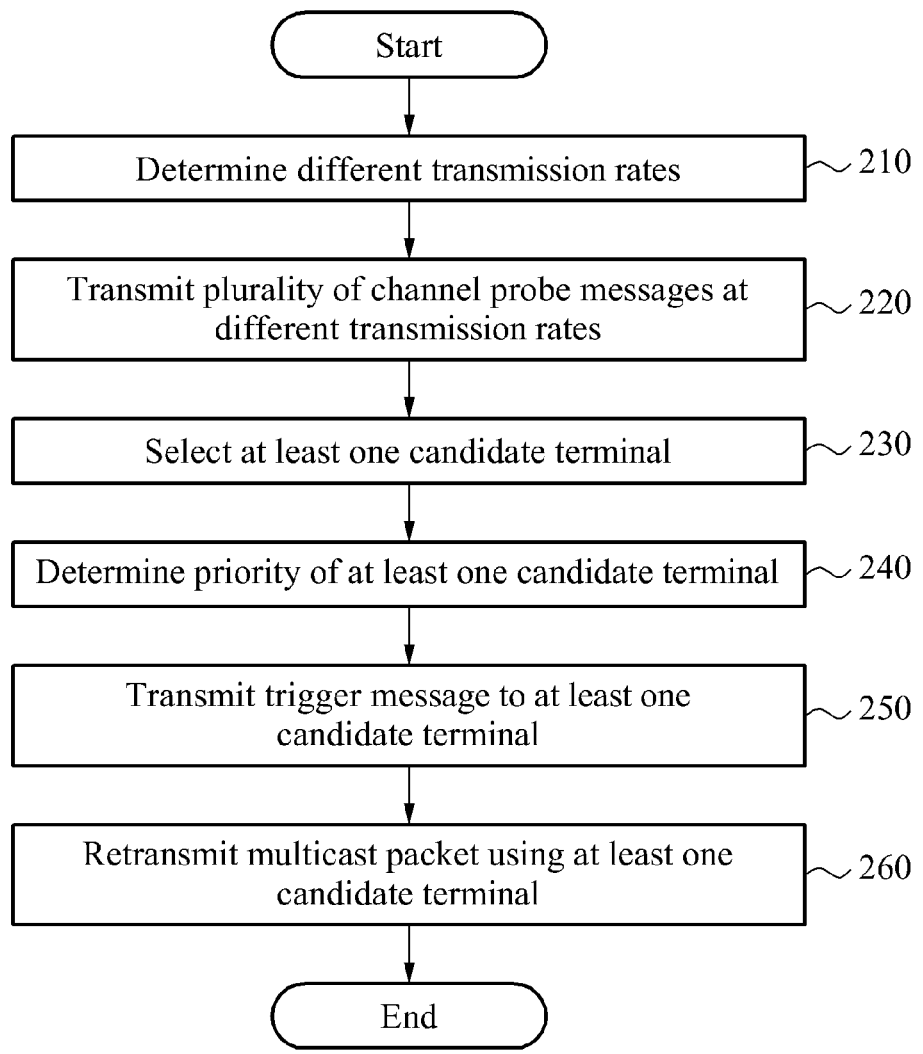
FIG. 2 is a flowchart illustrating an example of a communication method of an AP for retransmission of a multicast packet.

FIG. 2 illustrates an example of a communication method of an AP for retransmission of a multicast packet. The AP retransmits the multicast packet through two steps, that is, selecting a terminal capable of retransmitting the multicast packet from a plurality of terminals included in a network and retransmitting the multicast packet, using the selected terminal.

In operation 210, the AP determines different transmission rates for transmission of packets to the terminals. The different data rates may be used to select at least one candidate terminal for retransmission of the multicast packet.

In operation 220, the AP transmits a plurality of channel probe messages at the different transmission rates to the terminals. The channel probe message denotes a message transmitted to find a terminal capable of retransmitting the multicast packet of a multicast subject, among the terminals participating in the multicast.

For example, the channel probe message may include a multicast retransmit probe (MRP) message. The MRP message may include a message type, a data rate at which data included in the message is transmitted, a data rate of the at least one candidate terminal, a window size used in a contention period (CP) of the at least one candidate terminal, and/or the data. The MRP message will be described with reference to FIG. 4.

In operation 230, the AP selects the at least one candidate terminal for retransmission of the multicast packet from the terminals. To select the at least one candidate terminal, the AP may transmit a request message to the terminals to request the terminals to apply for retransmission of the multicast packet. For example, the request message may be a multicast retransmit apply (MRA) request message. The MRA request message will be described with reference to FIG. 7. The AP may receive a response message responding to the request message, from the at least one candidate terminal, and select the at least one candidate terminal based on the response message.

In operation 240, the AP determines priority of the at least one candidate terminal. After the at least one candidate terminal and the priority are determined, the AP may broadcast, to the terminals, an allocation message informing a result of the selecting of the at least one candidate terminal. The allocation message may be an MRA allocation message. The MRA allocation message may include a message type, an identifier (ID) of the at least one candidate terminal, and/or the priority of the at least one candidate terminal. The MRA allocation message will be described with reference to FIG. 10.

In operation 250, the AP transmits a trigger message including information for retransmission of the multicast packet determined based on the priority, to the at least one candidate terminal. The trigger message informs the at least one candidate terminal of a start of a retransmission section of the multicast packet. For example, the trigger message may be a multicast retransmit multi poll (MRMP) message. The trigger message will be described with reference to FIG. 13.

In operation 260, the AP retransmits the multicast packet using the at least one candidate terminal.

Figure 3:
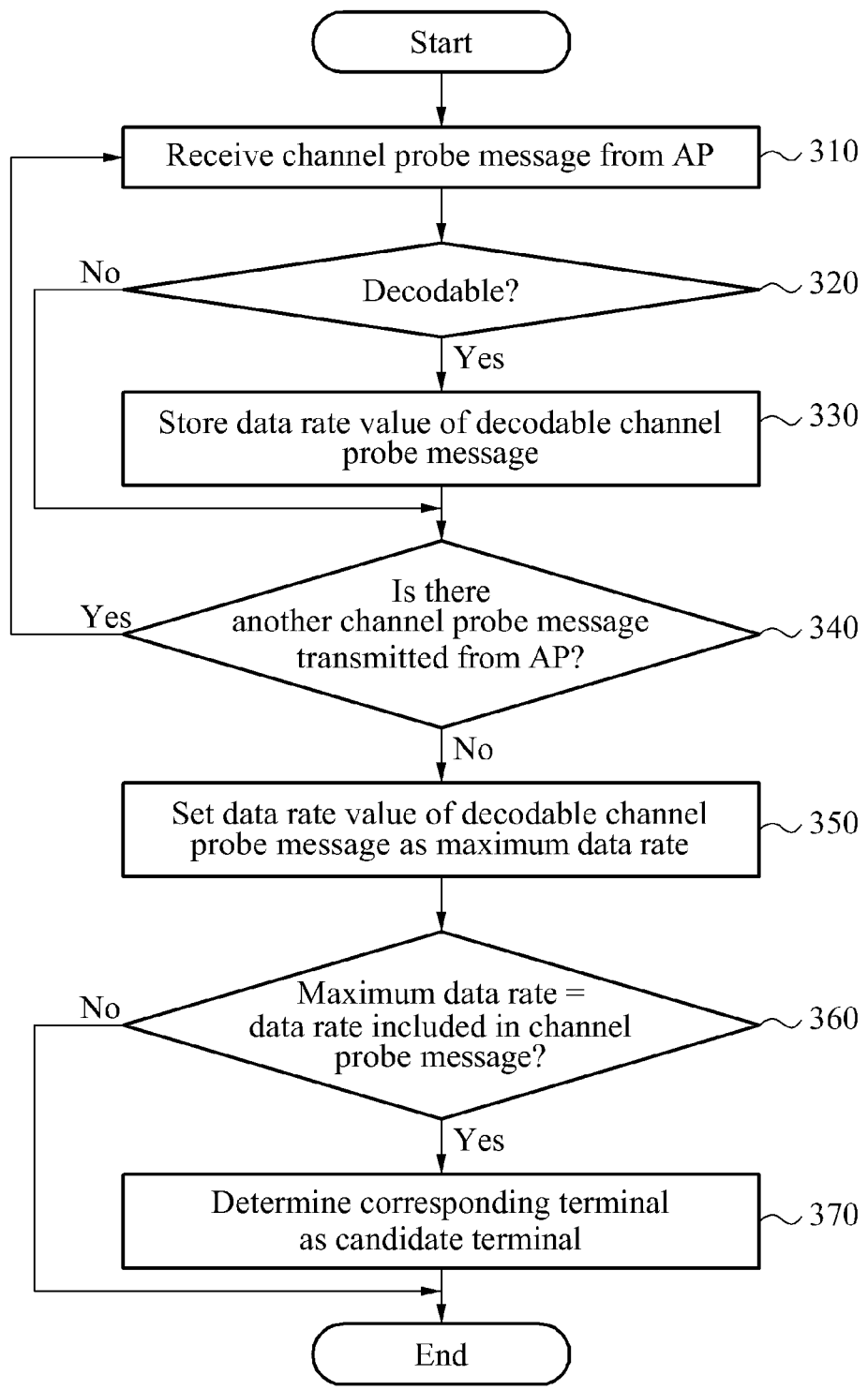
FIG. 3 is a flowchart illustrating an example of a communication method of a terminal for retransmission of a multicast packet.

FIG. 3 illustrates an example of a communication method of a terminal for retransmission of a multicast packet. The terminal may receive a plurality of channel probe messages having different data rates, from the AP. The AP may determine the data rates, and transmit the plurality of channel probe messages to the terminal at the different data rates, so that terminals may predict their data rates. It may be presumed that headers of the channel probe messages are transmitted at a data rate to be commonly receivable by a plurality of terminals.

The channel probe messages may be used to select at least one candidate terminal for retransmission of the multicast packet. The terminals may receive the channel probe messages, and participate in the retransmission of the multicast packet according to a result of determining whether the data rate of each of the terminals is equal to a retransmission data rate. Hereinafter, a process in which the terminal is selected as a candidate terminal for retransmission of the multicast packet by receiving the channel probe messages will be described with reference to FIG. 3.

In operation 310, the terminal receives the channel probe message from the AP.

In operation 320, the terminal determines whether the channel probe message is decodable. When the channel probe message is determined to be decodable, the terminal continues in operation 330. Otherwise, the terminal continues in operation 340.

In operation 330, the terminal stores a data rate value included in a header of the decodable channel probe message.

In operation 340, the terminal determines whether another channel probe message transmitted from the AP is present. When another channel probe message transmitted from the AP is determined to be present, the terminal returns to operation 310 to receive the other channel probe message transmitted from the AP. The foregoing process is repeated until the AP completes transmission of all channel probe messages.

In operation 350, the terminal sets the data rate value of the decodable channel probe message as a maximum data rate (MaxDR). After all of the channel probe messages are transmitted from the AP, the terminal may set a data rate value of a decodable channel probe message among the received channel probe messages as the MaxDR.

In operation 360, the terminal determines whether the MaxDR is equal to a data rate included in the channel probe message. The data rate included in the channel probe message may be a data rate of at least one candidate terminal included in the header of the channel probe message. When the MaxDR is determined to be equal to the data rate included in the channel probe message, the terminal continues in operation 370. Otherwise, the method ends.

In operation 370, the terminal determines the corresponding terminal as a candidate terminal for retransmission of the multicast packet. That is, the terminal may recognize itself as the candidate terminal capable of retransmitting the multicast packet.

Figure 4:
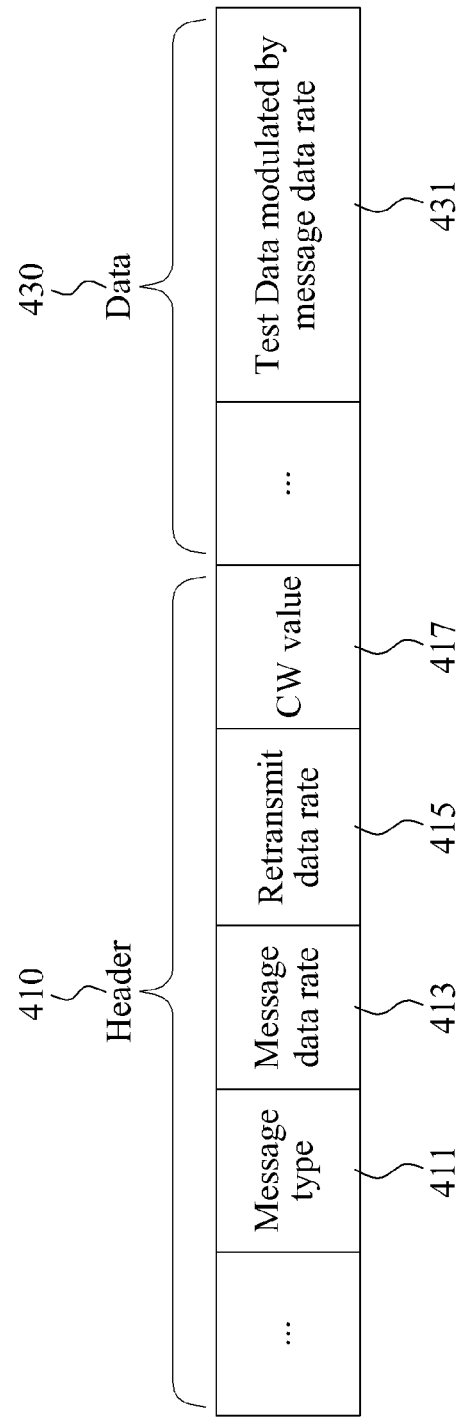
FIG. 4 is a diagram illustrating an example of a configuration of a multicast retransmit probe (MRP) message.

FIG. 4 illustrates an example of a configuration of an MRP message. Referring to FIG. 4, the configuration of the MRP message is shown as an example of a channel probe message.

A header 410 of the MRP message includes a message type field 411, a message data rate field 413, a retransmission data rate field 415, and a contention window (CW) value field 417. The AP transmits the header 410 at a low transmission rate so that most of terminals may decode the header 410.

A data 430 of the MRP message includes test data 431 modulated by the message data rate. The data 430 may be transmitted at the message data rate indicated by the header 410. Length of the data 430 may be variable, and used for measurement of a packet error rate (PER). A number of MRP messages transmitted to the terminals by the AP may also be variably managed for measurement of the PER.

The message type field 411 includes information on a message type indicating that the corresponding message is a channel probe message or an MRP message. The message data rate field 413 includes information on a data rate to be used to transmit data included in the corresponding message. The retransmission data rate field 415 includes information indicating a data rate of at least one candidate terminal that retransmits a multicast packet. The CW value field 417 includes information indicating a size of a CW to be used in a CP to select the at least one candidate terminal to retransmit the multicast packet later.

Figure 5:
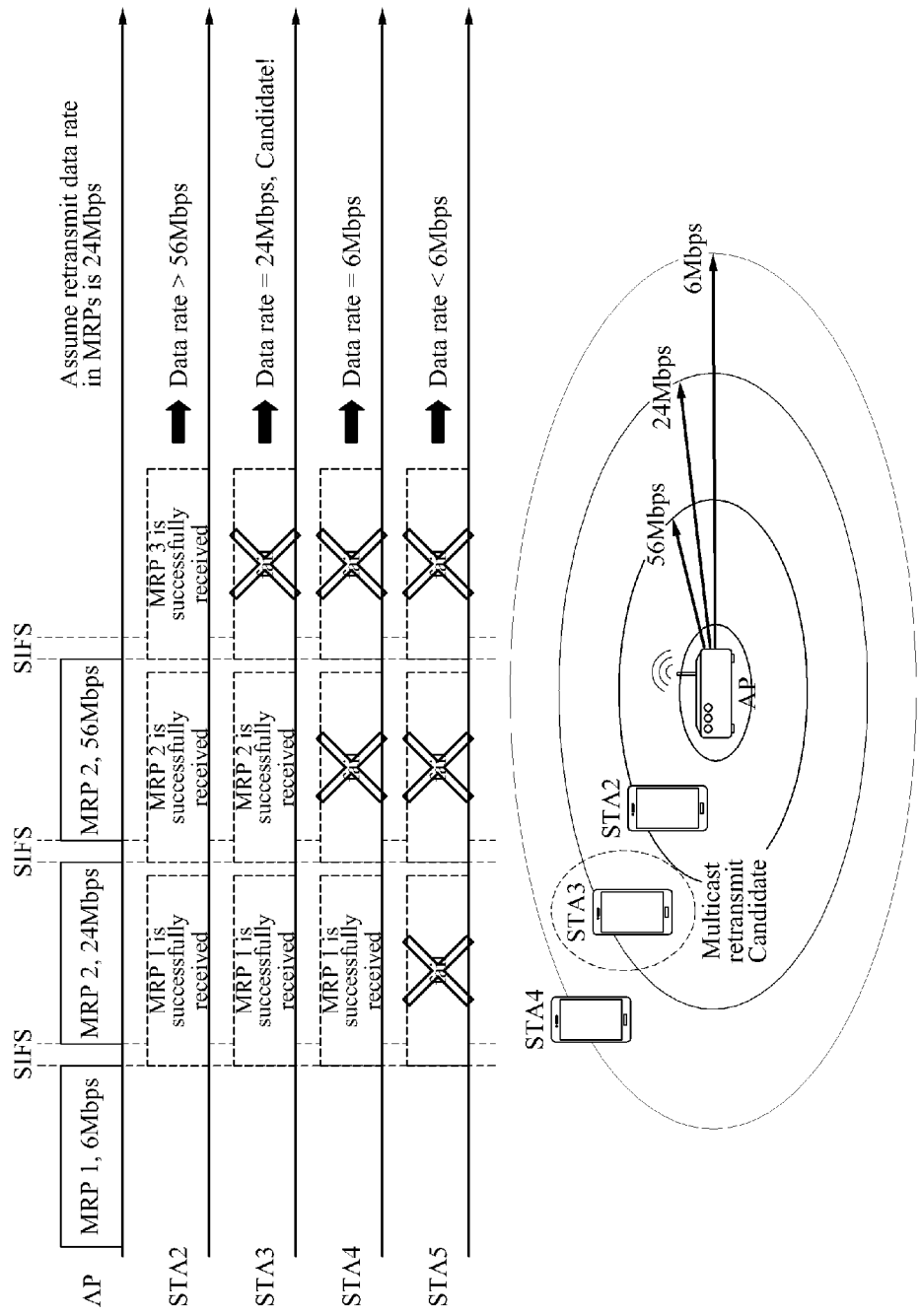
FIG. 5 is a diagram illustrating an example of a method of predicting data rates of a plurality of terminals by the plurality of terminals, using multicast packets having different data rates and transmitted by an AP.

FIG. 5 illustrates an example of a method of predicting data rates of a plurality of terminals by the plurality of terminals, using multicast packets having different data rates, and transmitted by an AP. Referring to FIG. 5, the AP transmits a plurality of MRP messages having different data rates to the terminals STA2, STA3, STA4, and STA5. Hereinafter, the MRP message may be understood as having the same meaning as an MRP packet.

When it is intended that a terminal STA having a data rate of about 24 Mbps is to participate in retransmission, the AP may transmit an MRP 1 message at about 6 Mbps, an MRP 2 message at about 24 Mbps, and an MRP 3 message at about 56 Mbps, to the terminals STA2, STA3, STA4, and STA5. Depending on examples, the AP may transmit two MRP messages at about 24 Mbps and about 56 Mbps, respectively, to the terminals STA2, STA3, STA4, and STA5.

The terminals STA2, STA3, STA4, and STA5 receives the MRP messages having the different data rates from the AP, thereby predicting data rates of themselves according to the process described with reference to FIG. 3.

For example, referring to FIGS. 3 and 5, since the terminal 2 STA2 successfully received the MRP 1 message of about 6 Mbps, the MRP 2 message of about 24 Mbps, and the MRP 3 message of about 56 Mbps, the terminal 2 STA2 estimates that the data rate of the terminal 2 STA2 itself is about 56 Mbps or higher. The terminal 3 STA3 that successfully received the MRP 1 message of about 6 Mbps and the MRP 2 message of about 24 Mbps estimates that the data rate of the terminal 3 STA3 itself is about 24 Mbps. The terminal 4 STA4 that successfully received only the MRP 1 message of about 6 Mbps estimates that the data rate of the terminal 4 STA4 itself is about 6 Mbps. The terminal 5 STA5 that has not successfully received a message of any data rate estimates that the data rate of the terminal 5 STA5 itself is about 6 Mbps or lower. As a result, the terminal 3 STA3 having the data rate of about 24 Mbps recognizes that the terminal 3 STA3 itself is a candidate terminal capable of retransmitting the multicast packet.

When the terminals determine their states through the foregoing process, the AP transmits a message requesting at least one terminal determined to be a transmission candidate terminal to apply to retransmit the multicast packet. The requesting message may be an MRA request message. The MRA request message will be described with reference to FIG. 7.

Figure 6:
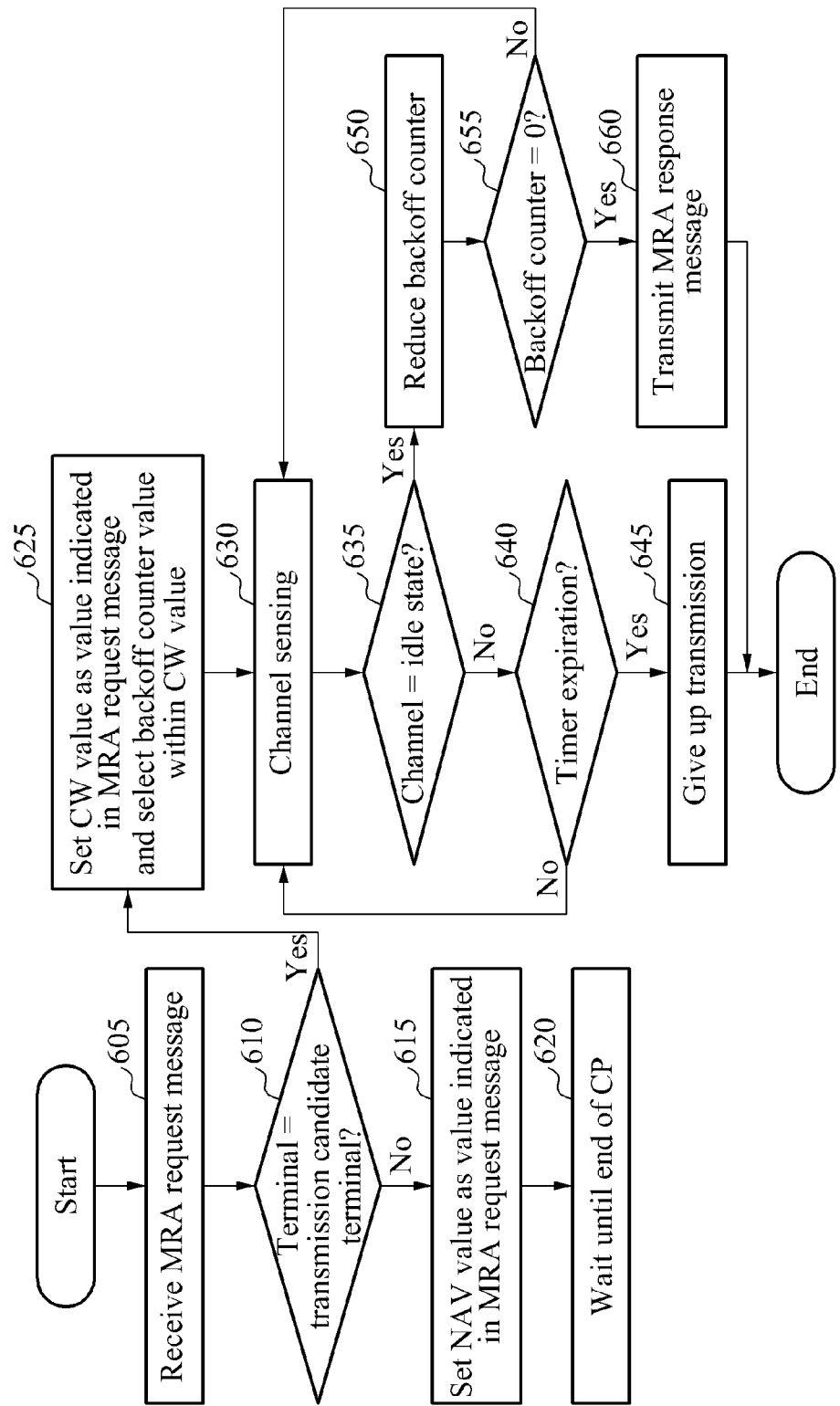
FIG. 6 is a flowchart illustrating an example of a method of managing messages for retransmission of a multicast packet in a network including an AP and a plurality of terminals.

FIG. 6 illustrates an example of a method of managing messages for retransmission of a multicast packet in a network including an AP and a plurality of terminals. Referring to FIG. 6, in operation 605, the terminal receives from the AP an MRA request message requesting the terminals to apply for retransmission of the multicast packet.

In operation 610, the terminal determines whether the terminal itself is a transmission candidate terminal for the retransmission of the multicast packet. When the terminal is determined to be a transmission candidate terminal, the terminal continues in operation 625. Otherwise, the terminal continues in operation 615.

In operation 615, the terminal sets a network allocation vector (NAV) value as a value indicated in the MRA request message, for example, a virtual carrier sense value notifying terminals other than candidate terminals to restrain use of channels. The NAV value may be understood as having the same meaning as an expiration timer.

In operation 620, the terminal waits until an end of an CP according to the virtual carrier sense value while restraining use of the channels. After the waiting, when the NAV value expires, the CP ends, and then the terminal ends the method.

In operation 625, the terminal sets a CW value of the terminal as the value indicated in the MRA request message, and randomly selects a backoff counter value within the CW value.

In operation 630, the terminal senses a channel.

In operation 635, the terminal determines whether the channel is in an idle state, that is, whether the channel is clear or not in a busy state. When the channel is determined to be in the idle state, the terminal continues in operation 650. Otherwise, the terminal continues in operation 640.

In operation 640, the terminal determines whether the CP is ended, using an expiration state of a timer value. When the CP is determined to be ended, the terminal continues in operation 645. Otherwise, the terminal returns to operation 630.

In operation 645, the terminal gives up the transmission.

In operation 650, the terminal reduces or decrements the backoff counter value of the terminal by a distributed coordination function (DCF) method. The DCF method is a method of distributively accessing channels in a wireless local access network (LAN). According to a general DCF method, a terminal may select a backoff counter value within a predetermined range to transmit packets, and participate in contention. Next, the terminal may decrement the backoff counter value at every idle state of a channel through channel sensing, and transmit a packet when the backoff counter value of the terminal becomes 0.

However, the DCF method of the example herein may include randomly selecting the backoff counter value within the CW value, determining whether the CP is ended, using the expiration state of the timer value, and transmitting an MRA response message to the AP when the backoff counter value reaches 0 as discussed below. Thus, the DCF method of the example herein is different from the general DCF.

In operation 655, the terminal determines whether the backoff counter value has reached 0. When the backoff counter value is determined to have reached 0, the terminal continues in operation 660. Otherwise, the terminal returns to operation 630.

In operation 660, the terminal transmits the MRA response message to the AP.

Figure 7:
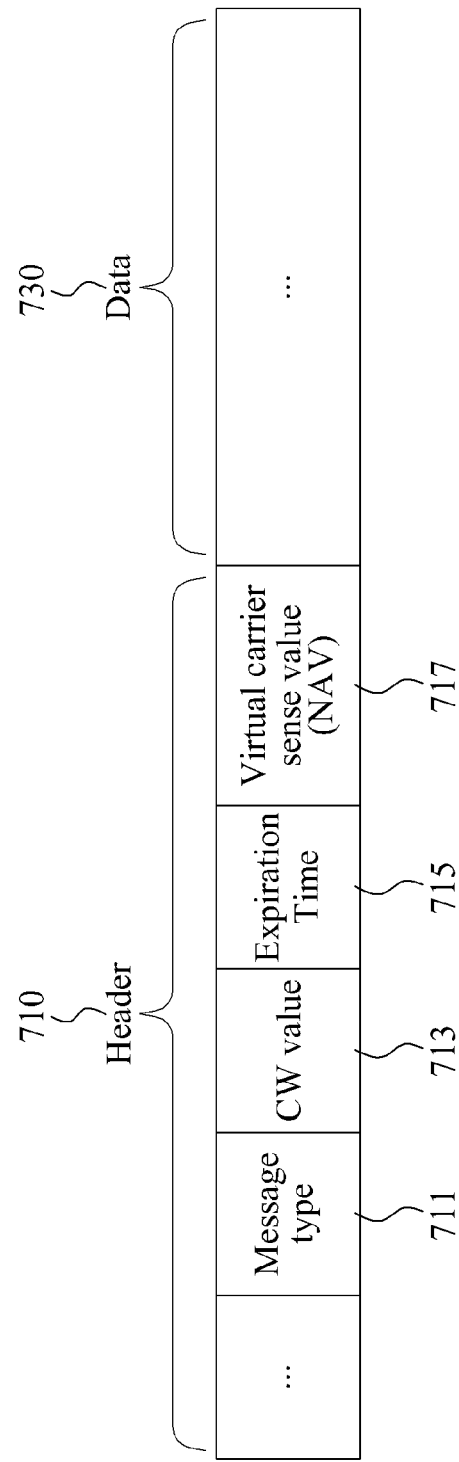
FIG. 7 is a diagram illustrating an example of a configuration of a request message requesting application for retransmission of a multicast packet.

FIG. 7 illustrates an example of a configuration of a request message requesting application for retransmission of a multicast packet. Referring to FIG. 7, an MRA request message, from an AP, requests a multicast transmission end, that is, at least one candidate terminal for the retransmission of the multicast packet.

The at least one candidate terminal having received the MRA request message may participate in contention, and transmit a response message responding to the MRA request message. Other terminals other than the at least one candidate terminal may restrain use of channels for a predetermined time. The MRA request message may protect an MRA period, for example, using a timer.

The MRA request message includes a header 710 and data 730. The header 710 includes a message type field 711, a CW value field 713, an expiration timer field 715, and a virtual carrier sense value (NAV) field 717.

The message type field 711 includes information informing that the corresponding message is the MRA request message. The CW value field 713 includes information indicating a CW value used in a CP in which the at least one candidate terminal contends for the retransmission of the multicast packet. The CP or the CW value may be determined according to a size of the network. The expiration timer field 715 includes information informing whether the CP for the at least one candidate terminal to participate in is expired. The virtual carrier sense value field 717 includes information informing other terminals other than the at least one candidate terminal to restrain use of the channels.

Figure 8:
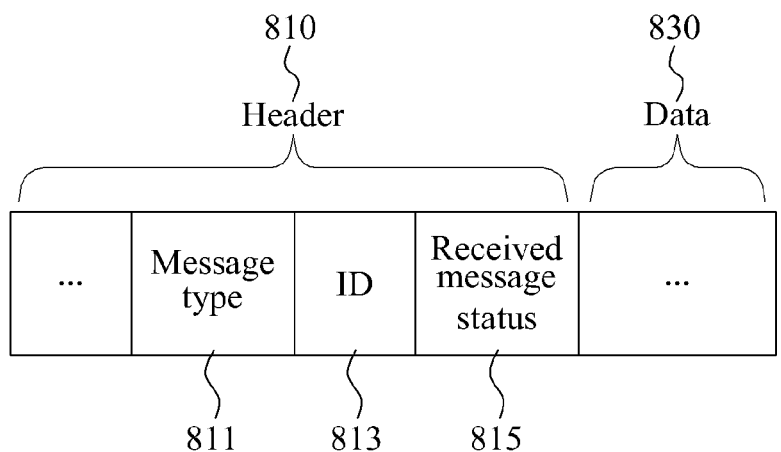
FIG. 8 is a diagram illustrating an example of a configuration of a response message responding to the request message of FIG. 7.

FIG. 8 illustrates an example of a configuration of a response message responding to the request message of FIG. 7. Referring to FIG. 8, the response message may be used by at least one candidate terminal to respond to an MRA request message. The candidate terminal may inform an AP of an ID of the candidate terminal through the response message. For example, the response message may include an MRA response message.

The MRA response message includes a header 810 and data 830. The header 810 includes a message type field 811, an ID field 813, and a received message status field 815.

The message type field 811 includes information indicating that the corresponding message is the MRA response message. The ID field 813 includes information identifying the corresponding terminal or candidate terminal, for example, a Media Access Control (MAC) ID. The received message status field 815 may include status information of the terminal or candidate terminal, determined by the terminal or candidate terminal through a previously received message (e.g., the MRA request message) or packet. For example, the status information may include various status information related to communication, such as a PER determined by the terminal or candidate terminal through the previously received message or packet.

Figure 9:
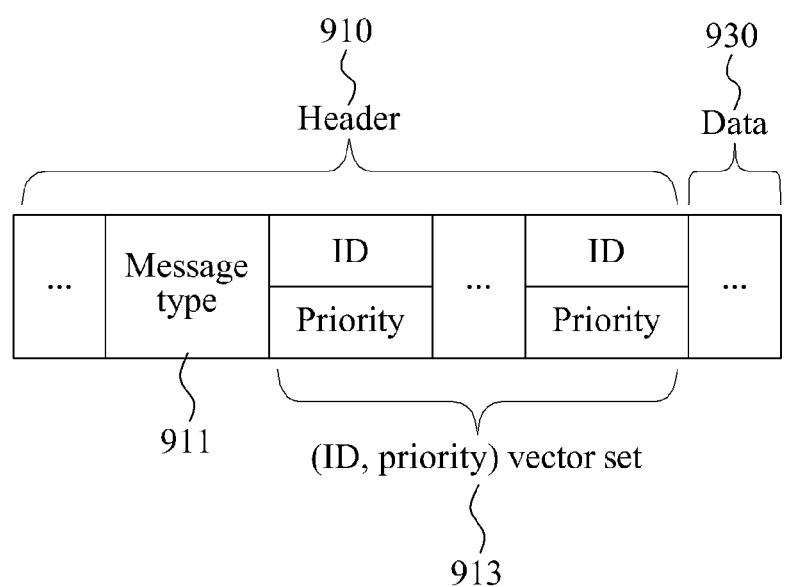
FIG. 9 is a diagram illustrating an example of a configuration of an allocation message informing of a candidate terminal that retransmits a multicast packet.

FIG. 9 illustrates an example of a configuration of an allocation message informing of a candidate terminal that retransmits a multicast packet. Referring to FIG. 9, the allocation message may be broadcasted into the network to inform a result of selecting, by an AP, the candidate terminal for retransmission of the multicast packet. For example, the allocation message may include an MRA allocation message.

As a response to the MRA response message, the MRA allocation message may inform priority of terminals selected as candidate terminals for the retransmission of the multicast packet to terminals. The priority may be determined according to an order of arrival of the MRA response messages at the AP or according to various other management methods. The MRA allocation message may be broadcasted to each of terminals of which an expiration time of an MRA period is up or of which a last MRA response message is transmitted to the AP after the expiration time.

The MRA allocation message includes a header 910 and data 930. The header 910 includes a message type field 911 and an ID and priority field 913.

The message type field 911 includes information indicating that the corresponding message is the MRA allocation message. The ID and priority field 913 includes a vector set that includes IDs of the candidate terminals selected as retransmission terminals and priorities of the candidate terminals.

Figure 10A:
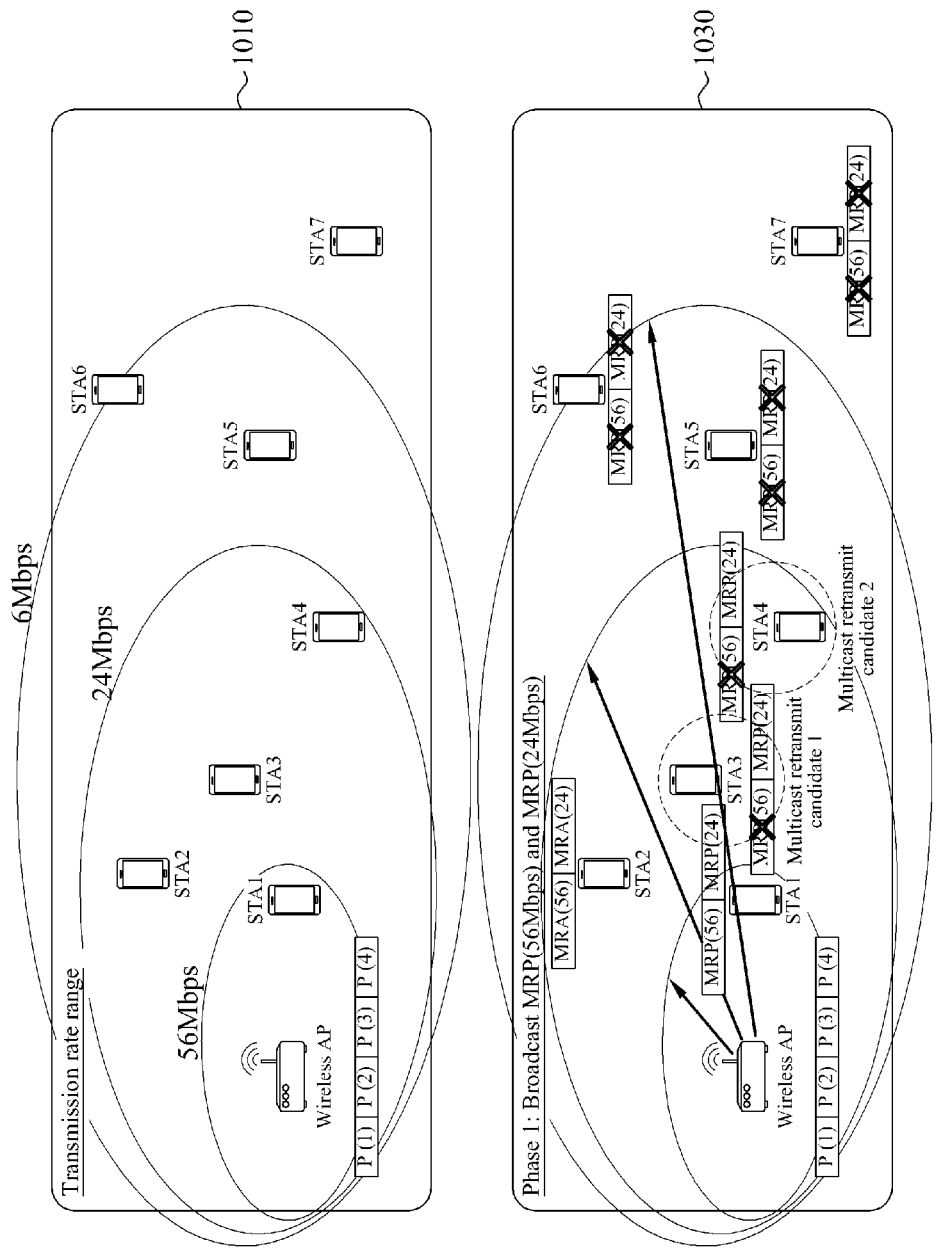
FIGS. 10A and 10B are diagrams illustrating an example of a process of selecting at least one candidate terminal for retransmission of a multicast packet.
Figure 10B:
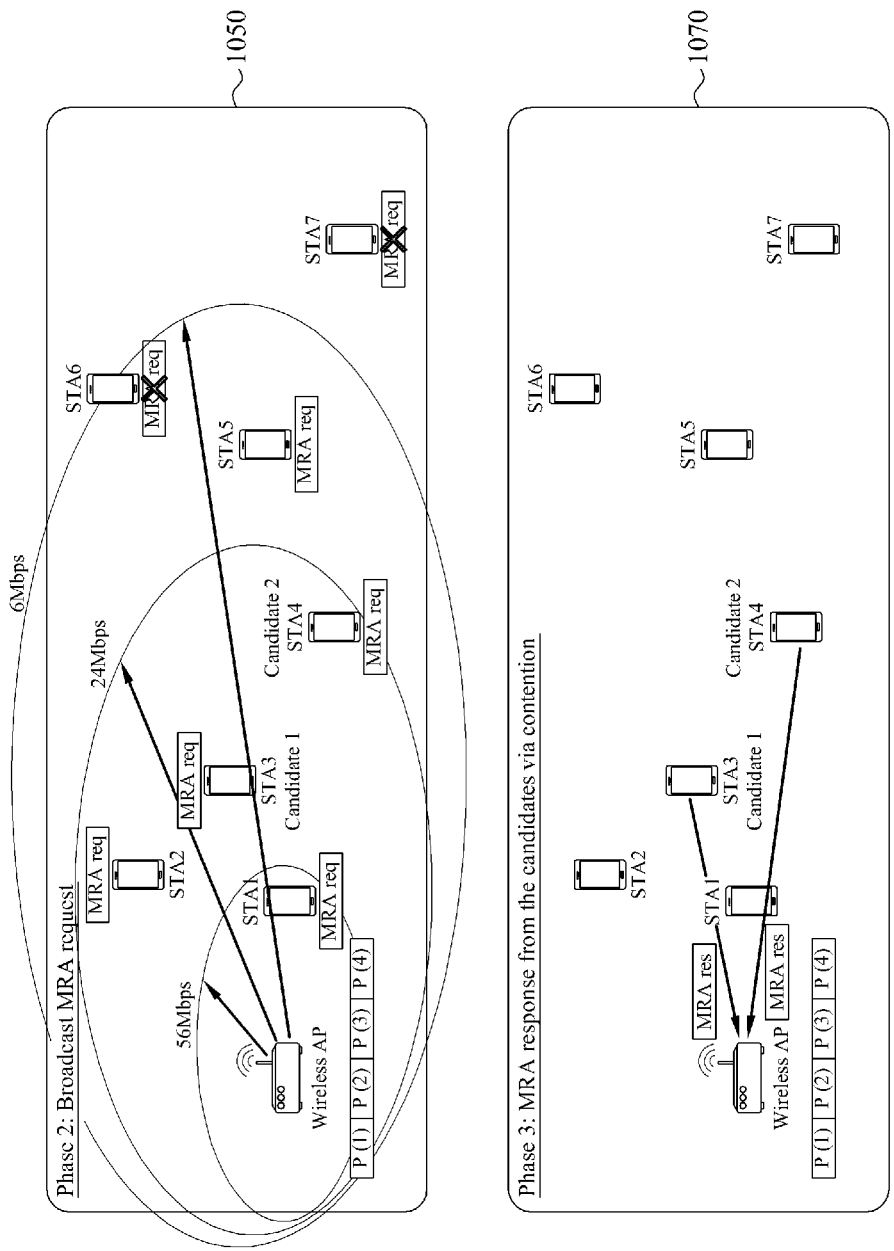

FIGS. 10A and 10B illustrate an example of a process of selecting at least one candidate terminal for retransmission of a multicast packet. Referring to FIG. 10A, a network includes an AP and seven terminals STA1, STA2, STA3, STA4, STA5, STA6, and STA7. A transmission rate range of the AP is shown by 1010.

In phase 1 1030, the AP broadcasts an MRP message of about 24 Mbps and an MRP message of about 54 Mbps to the terminals STA1, STA2, STA3, STA4, STA5, STA6, and STA7. Reception of the MRP messages may be determined according to channel states of the terminals STA1, STA2, STA3, STA4, STA5, STA6, and STA7. In the phase 1 1030, since the terminal 3 STA3 and the terminal 4 STA4 successfully decode only the MRP message transmitted at about 24 Mbps, the terminals STA3 and STA4 determine the terminals STA3 and STA4 themselves as candidate terminals capable of retransmitting the multicast packet at a data rate of about 24 Mbps.

Referring to FIG. 10B, in phase 2 1050, the AP broadcasts an MRA request message into the network, so that the terminals selected as the terminals for the retransmission of the multicast packet may apply for the retransmission.

In phase 3 1070, each of the terminal 3 STA3 and the terminal 4 STA4, which are the candidate terminals for the retransmission of the multicast packet among the terminals having received the MRA request messages, transmits an MRA response message to the AP. Each of the terminal 3 STA3 and the terminal 4 STA4 may transmit the MRA response message to the AP through contention.

The AP may broadcast an MRA allocation message to inform the terminals in the network that the terminal 3 STA3 and the terminal 4 STA4 are selected as the candidate terminals. However, the broadcasting may not be performed depending on an operator.

Figure 11:
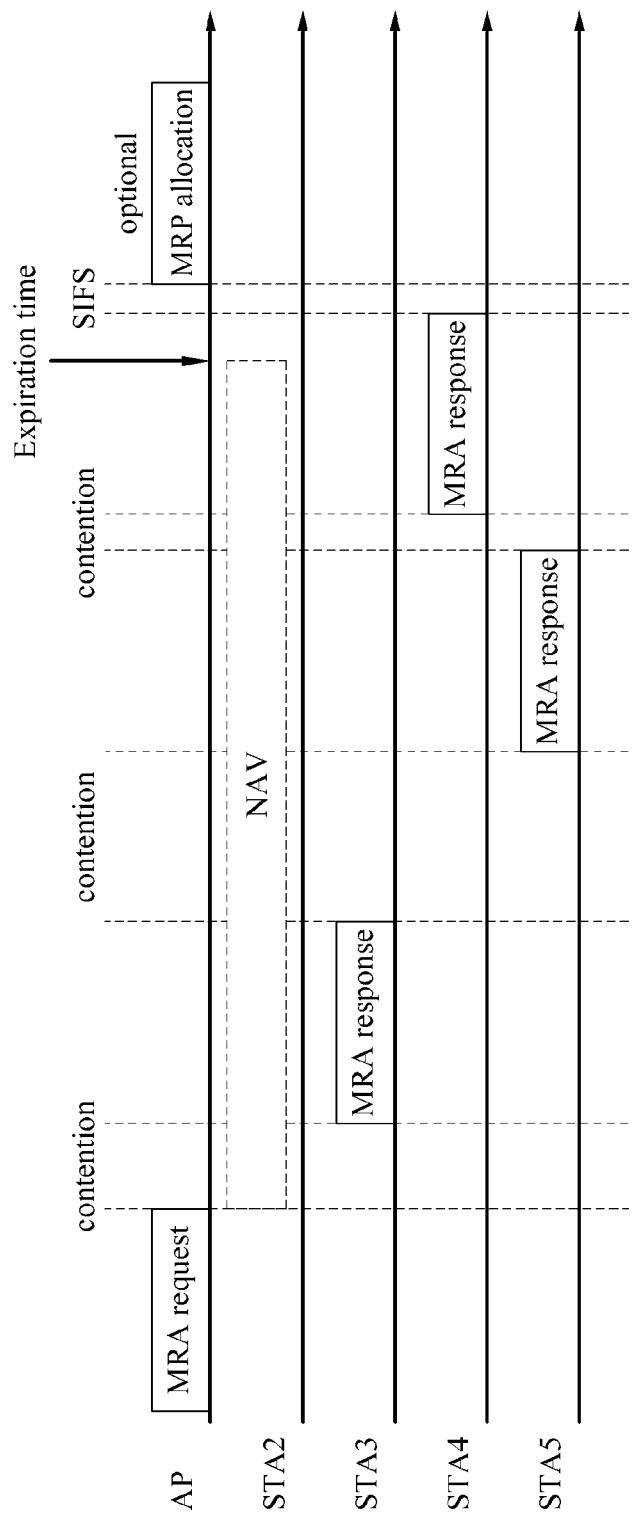
FIG. 11 is a diagram illustrating an example of a method of managing messages exchanged between an AP and terminals in the process of FIGS. 10A and 10B.

FIG. 11 illustrates an example of a method of managing messages exchanged between the AP and the terminals in the process of FIGS. 10A and 10B. Referring to FIG. 11, the network includes the AP and the four terminals STA2, STA3, STA4, and STA5. For example, it may be presumed that the terminals STA3, STA4, and STA5 are candidate terminals for retransmission of the multicast packet whereas the terminal STA2 is not a candidate terminal but another terminal.

When the AP transmits an MRA request message into the network, each of the candidate terminals STA3, STA4, and STA5 transmits an MRA response message to the AP through contention. The terminal 2 STA2, which is not a candidate terminal, defers transmission and waits without using a channel through a NAV value. The NAV value refers to an expiration time of an MRA period in which messages (i.e., the MRA response messages) for application for the retransmission of the multicast packet are transmitted. After the MRA period and a Short Interframe Space (SIFS), the AP may broadcast an MRA allocation message to inform the terminals in the network that the terminals STA3, STA4, and STA5 are selected as the candidate terminals.

In FIG. 11, the MRA response message of the terminal 3 STA3 is first transmitted to the AP, and then the MRA response messages of the terminal 5 STA5 and the terminal 4 STA4 are transmitted in sequence to the AP. Therefore, the AP may determine a priority of the candidate terminals in an order of the terminal 3 STA3, the terminal 5 STA5, and the terminal 4 STA4.

When the priority is determined, the terminals selected as the candidate terminals may retransmit the multicast packet sequentially according to the priority included in a trigger message transmitted by the AP. Hereinafter, a process of retransmitting the multicast packet by the candidate terminals will be described with reference to FIG. 12.

Figure 12:
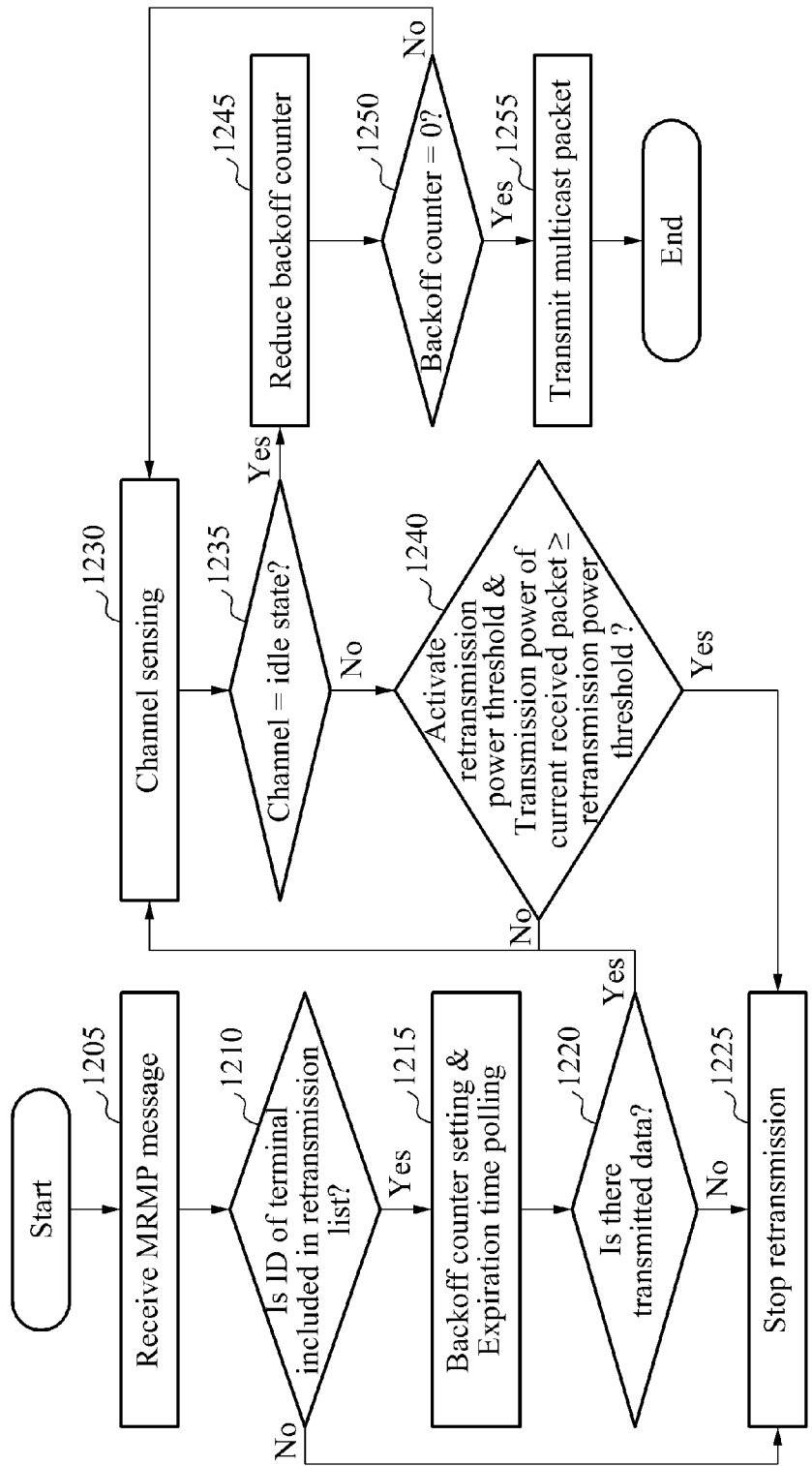
FIG. 12 is a flowchart illustrating an example of a process of retransmitting a multicast packet by a terminal.

FIG. 12 illustrates an example of a process of retransmitting a multicast packet by a terminal. Referring to FIG. 12, an AP may inform a start of a retransmission period by transmitting an MRMP message to at least one candidate terminal.

In operation 1205, a terminal, that is, the at least one candidate terminal, receives the MRMP message.

In operation 1210, the terminal determines whether a retransmission list of the MRMP message includes an ID of the terminal. When the retransmission list is determined to include the ID of the terminal, the terminal continues in operation 1215. Otherwise, the terminal continues in operation 1225.

In operation 1215, the terminal sets a backoff counter, and polls an expiration time.

In operation 1220, the terminal determines whether data to be transmitted, that is, the multicast packet to be retransmitted, is present. When the data to be transmitted is determined to be present, the terminal continues in operation 1230. Otherwise, the terminal continues in operation 1225.

In operation 1225, the terminal stops the retransmission.

In operation 1235, the terminal senses a channel.

In operation 1235, the terminal determines whether the channel is in an idle state, that is, whether the channel is clear. When the channel is determined to be in the idle state, the terminal continues in operation 1245. Otherwise, the terminal continues in operation 1240.

In operation 1240, the terminal activates a retransmission power threshold, and determines whether a transmission power of a currently received packet is greater than or equal to the retransmission power threshold. The activation of the retransmission power threshold refers to activation of an indicator that indicates whether the terminal needs to give up the retransmission based on a channel sensing result. When the transmission power of the currently received packet is determined to be greater than or equal to the retransmission power threshold, the terminal continues in operation 1225. Otherwise, the terminal returns to operation 1230.

That is, when the transmission power of the currently received packet is determined to be greater than or equal to the retransmission power threshold of the corresponding terminal, this may imply that a candidate terminal that recently tried retransmission is present around the terminal, and the candidate terminal is higher in priority than the terminal. In this example, the terminal may stop the retransmission of the multicast packet in operation 1225. In another example, when the transmission power of the multicast packet currently transmitted through the channel is determined to be greater than or equal to the retransmission power threshold of the packet retransmitted by the terminal, the terminal may determine that the candidate terminal having a higher priority than the terminal transmits the multicast packet, and cancel repeated operations in operation 1225.

In operation 1245, the terminal reduces or decrements the backoff counter according to an DCF method.

In operation 1250, the terminal determines whether the backoff counter reaches 0. When the backoff counter is determined to reach 0, the terminal continues in operation 1255. Otherwise, the terminal returns to operation 1230, that is, performs the channel sensing again while waiting for a turn.

In operation 1255, the terminal retransmits the multicast packet.

Figure 13:
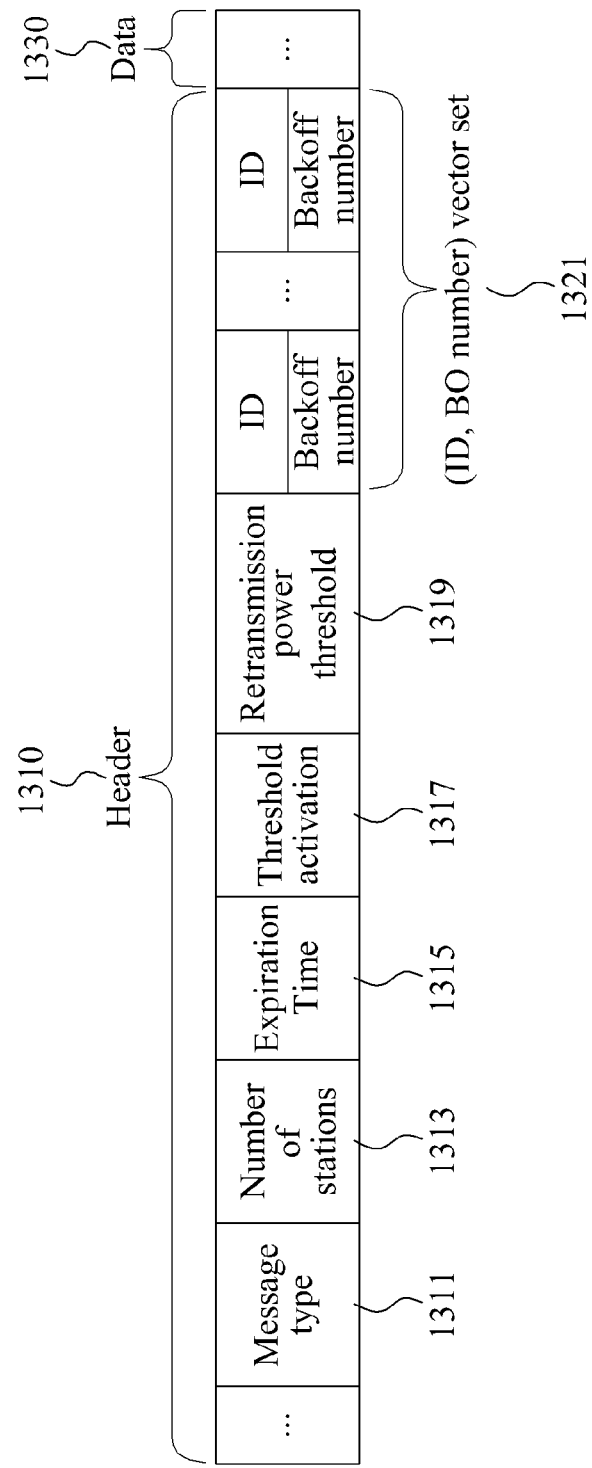
FIG. 13 is a diagram illustrating an example of a configuration of a trigger message.

FIG. 13 illustrates an example of a configuration of a trigger message. Referring to FIG. 13, the trigger message is transmitted by an AP to inform a terminal selected as a candidate terminal for retransmission of a multicast packet of a start of a retransmission period of the multicast packet. For example, the trigger message may be an MRMP message.

The MRMP message includes a header 1310 and data 1330. The header 1310 includes a message type field 1311, a number of station field 1313 including a number of at least one candidate terminal, an expiration time field 1315, a threshold activation field 1317, a retransmission power threshold field 1319, and a vector set field 1321 including an ID of the at least one candidate terminal and a backoff counter number of the at least one candidate terminal.

The message type field 1311 includes information indicating that the corresponding message is an MRMP message. The number of station field 1313 includes information indicating the number of the at least one candidate terminal that participates in retransmission of the multicast packet. The expiration time field 1315 includes information indicating an expiration time of a retransmission field of the multicast packet.

The threshold activation field 1317 includes information on whether to use a threshold value of retransmission power. The threshold activation field 1317 may include an indication message of whether to use a retransmission power threshold. For example, when the threshold activation field 1317 indicates ON or '1', and when a transmission power transmitted by another candidate terminal is higher than the retransmission power threshold based on a channel sensing result, the terminal may give up the retransmission.

The retransmission power threshold field 1319 includes information indicating the retransmission power threshold used when the corresponding terminal retransmits the multicast packet. The retransmission power threshold may be used by the at least one candidate terminal to determine whether to retransmit the multicast packet. The vector set field 1321 includes an ID of the terminal selected as the candidate terminal for the retransmission of the multicast packet and a backoff counter value of the terminal.

Figure 14A:
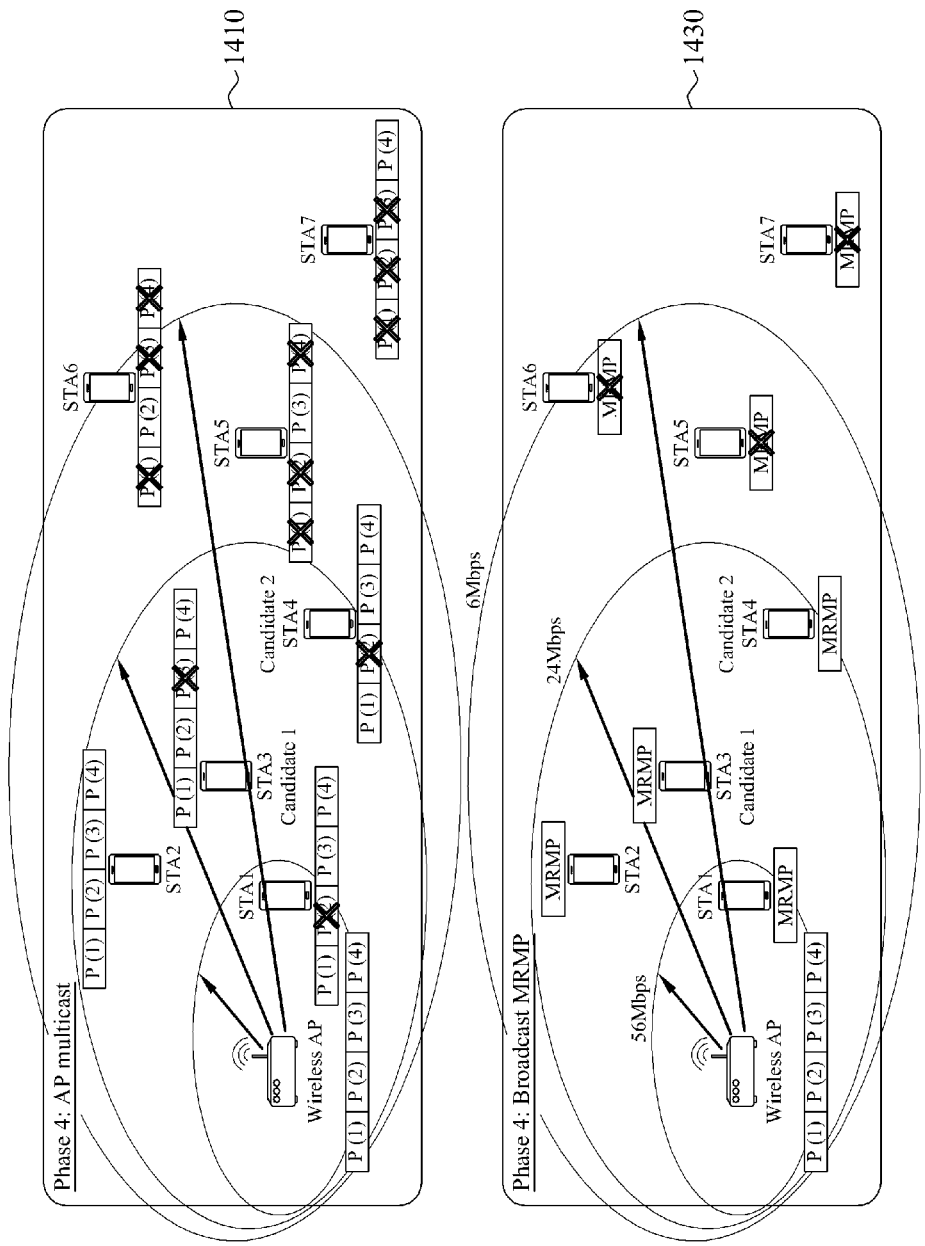
FIGS. 14A and 14B are diagrams illustrating an example of a process of retransmitting a multicast packet in a network including an AP and a plurality of terminals.
Figure 14B:
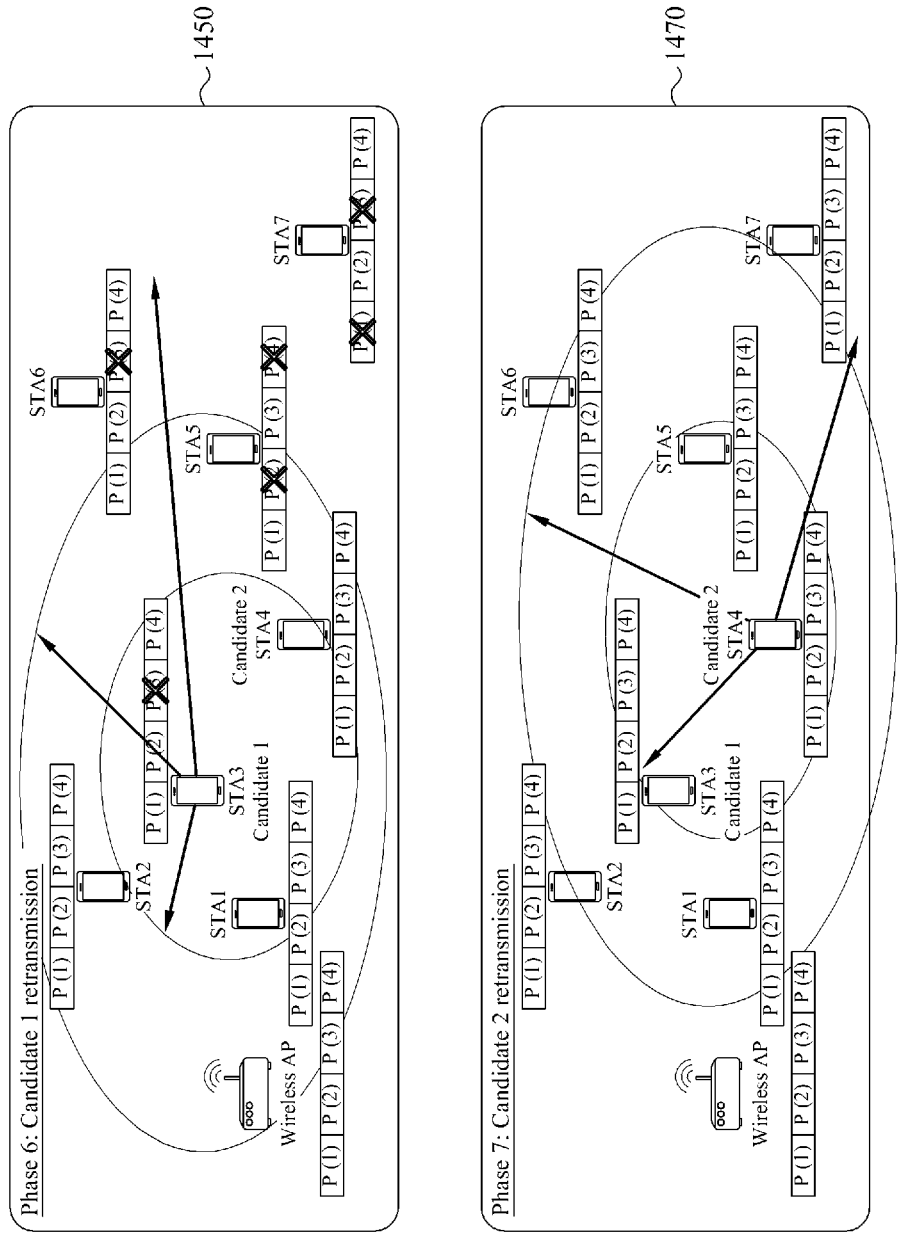

FIGS. 14A and 14B illustrate an example of a process of retransmitting a multicast packet in a network including an AP and a plurality of terminals. Referring to FIG. 14A, the network includes the AP and seven terminals STA1, STA2, STA3, STA4, STA5, STAG, and STAT. The process of retransmitting the multicast packet by the AP using the candidate terminals selected through the process of FIG. 10 will be described.

After the candidate terminals are selected, in phase 4 1410, the AP transmits the multicast packet. Whether the transmission of the multicast packet is successful may be determined according to a channel state of each of the terminals. For example, it may be presumed that the multicast packet transmitted by the AP may generate a partial error or loss in all of the terminals but the terminal 2 STA2. The AP may not directly retransmit the multicast packet, but restore a transmission failure, using the at least one candidate terminal selected by the process of FIG. 10.

As shown in phase 5 1430, the AP transmits an MRMP message to inform the terminals selected as the at least one candidate terminal to start the retransmission of the multicast packet. For example, it may be presumed that the terminal 3 STA3 and the terminal 4 STA4 are selected as the candidate terminals, and that the terminal 3 STA3 has a higher priority than the terminal 4 STA4.

Referring to FIG. 14B, the terminal 3 STA3 having the higher priority is allocated with a smaller backoff counter value than a backoff counter value of the terminal 4 STA4. Therefore, in phase 6 1450, the terminal 3 STA3 occupies a channel first, and performs the retransmission. Since the terminal 3 STA3 is located nearer to other terminals than the AP, the terminal 3 STA3 may retransmit the multicast packet with a higher success probability than the AP. The terminal 3 STA3 retransmits packets P(1), P(2), and P(4) that are successfully transmitted by the terminal 3 STA3 to the other terminals STA1, STA4, STA5, and STA7 that failed in receiving the multicast packet from the AP, so that the other terminals STA1, STA4, STA5, and STA7 receive missing packets again.

After the retransmission by the terminal 3 STA3 is completed, in phase 7 1470, the terminal 4 STA4 having a lower priority than the terminal 3 STA3 occupies the channel, and retransmits the packets P(1), P(2), P(3), and P(4) that are successfully transmitted by the terminal 4 STA4 to other terminals. Through the foregoing retransmission method according to the example, the multicast packet may be retransmitted at a relatively high data rate compared to when the multicast packet is retransmitted solely by the AP. In addition, the multicast packet may be efficiently transmitted even to a farther terminal with respect to the AP.

Figure 15:
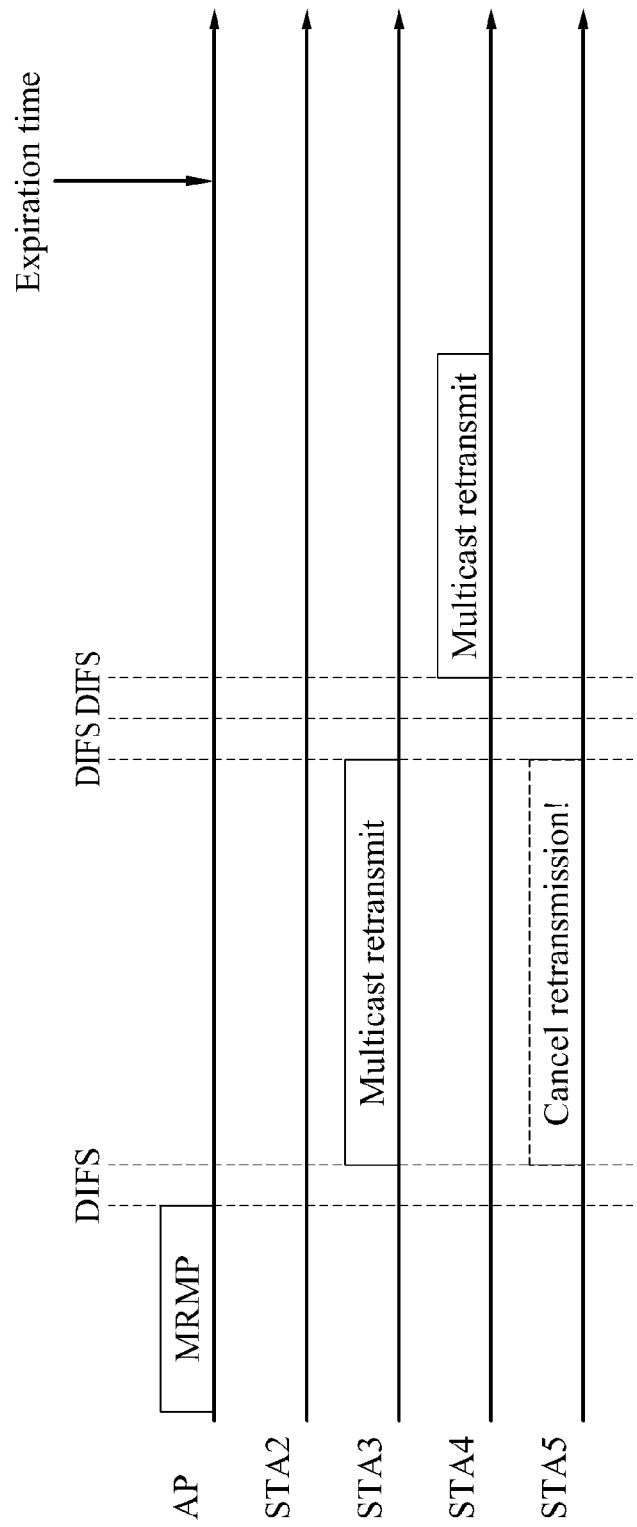
FIG. 15 is a diagram illustrating an example of a method of managing messages exchanged between the AP and the terminals in the retransmission process of FIG. 14.

FIG. 15 illustrates an example of a method of managing messages exchanged between the AP and the terminals in the retransmission process of FIG. 14. Referring to FIG. 15, the network includes the AP and the four terminals STA2, STA3, STA4, and STA5. In the following description, the terminals STA3, STA4, and STA5, arranged in order of high priority, are candidate terminals for retransmission of a multicast packet, and backoff counter values of the terminals STA3, STA4, and STA5 are 1, 3, and 4, respectively. The terminal 3 STA3 and the terminal 5 STA5 may be relatively near from each other.

The AP transmits an MRMP message into the network to inform the candidate terminals STA2, STA3, STA4, and STA5 of a start of a retransmission period. It is presumed that a threshold activation field of the MRMP message is set.

Since the backoff counter value of the terminal 3 STA3 is 1, the terminal 3 STA3 counts once, and retransmits the multicast packet. The terminal 5 STA5 sensing a channel receives the multicast packet transmitted by the terminal 3 STA3. When a multicast packet transmission power of the terminal 3 STA 3 is determined to be higher than a retransmission power threshold of the terminal 5 STA5, the terminal 5 STA5 gives up or cancels the retransmission. Since the backoff counter value of the terminal 4 STA4 is 3, the terminal 4 STA4 counts twice more, and retransmits the multicast packet.

Figure 16:
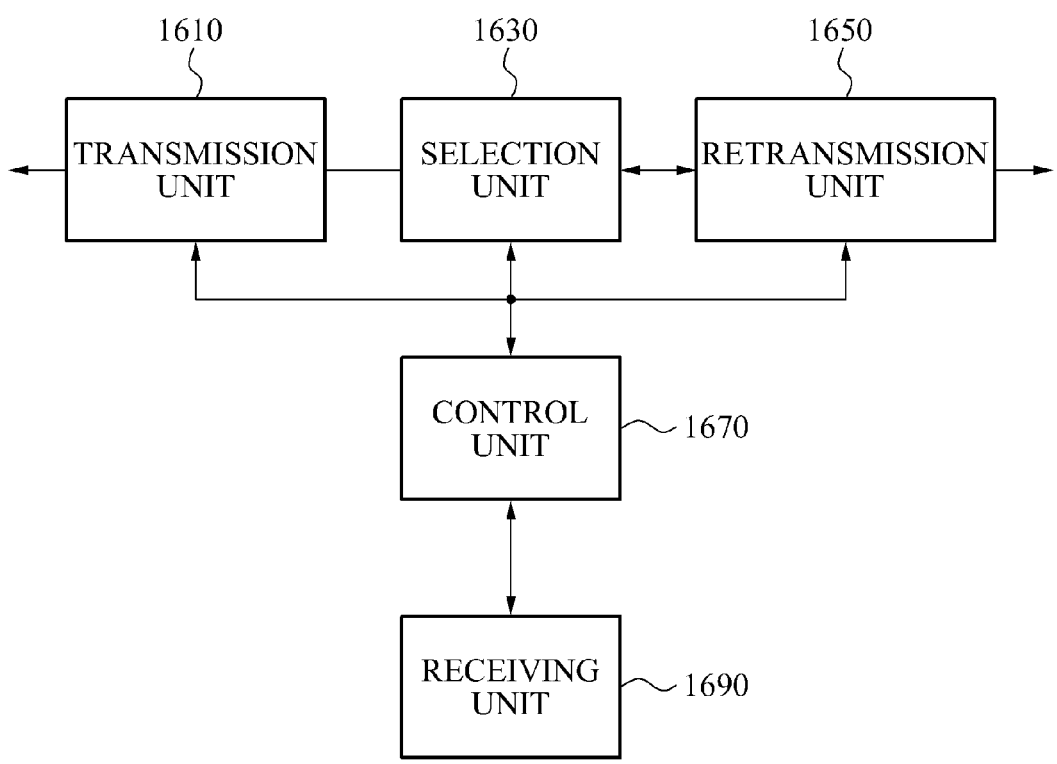
FIG. 16 is a block diagram illustrating an example of an AP for transmission of a multicast packet.

FIG. 16 illustrates an example of an AP for transmission of a multicast packet. Referring to FIG. 16, the AP includes a transmission unit 1610, a selection unit 1630, a retransmission unit 1650, a control unit 1670, and a receiving unit 1690.

The transmission unit 1610 transmits a request message to a plurality of terminals, the request message requesting the terminals to apply for retransmission of the multicast packet. Additionally, the transmission unit 1610 may broadcast, to the terminals, an allocation message informing a result of selecting at least one candidate terminal for the retransmission of the multicast packet from the terminals.

The selection unit 1630 selects the at least one candidate terminal for the retransmission of the multicast packet from the terminals.

The retransmission unit 1650 retransmits the multicast packet using the at least one candidate terminal selected by the selection unit 1630.

The control unit 1670 determines different data rates to be used to select the at least one candidate terminal for the retransmission of the multicast packet. The control unit 1670 controls the transmission unit 1610 to transmit, to the terminals, a plurality of channel probe messages having the different data rates. Furthermore, the control unit 1670 controls operations of the respective elements for the retransmission of the multicast packet.

The receiving unit 1690 receives, from the at least one candidate terminal, a response message responding to the request message. The selection unit 1630 sets a priority of the at least one candidate terminal based on the response message.

Figure 17:
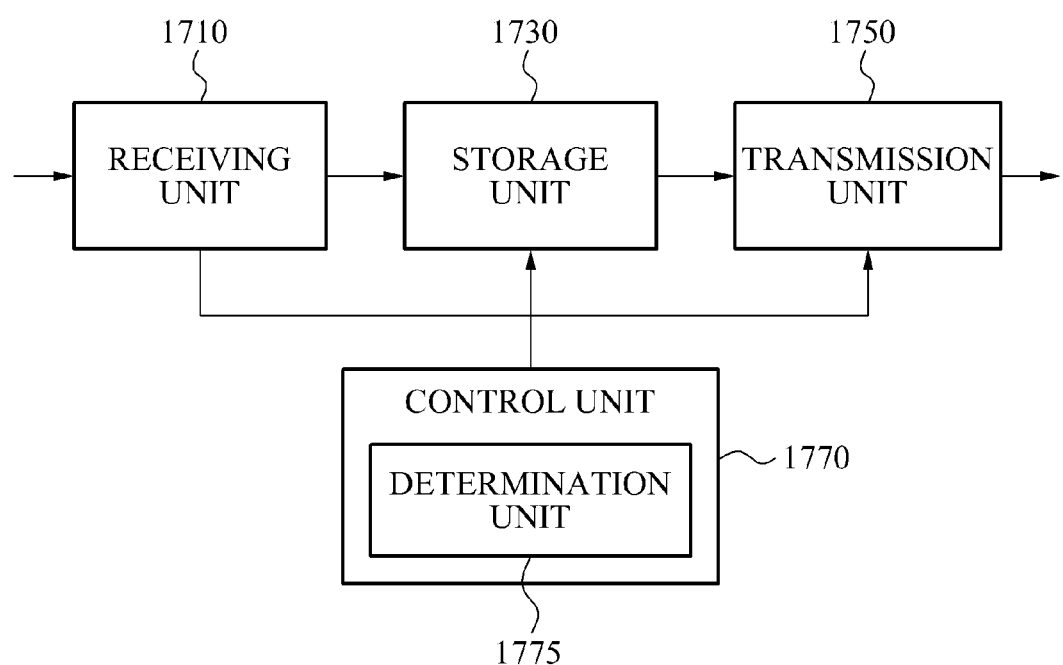
FIG. 17 is a block diagram illustrating an example of a terminal for retransmission of a multicast packet.

FIG. 17 illustrates an example of a terminal for retransmission of a multicast packet. Referring to FIG. 17, the terminal includes a receiving unit 1710, a storage unit 1730, a transmission unit 1750, and a control unit 1770.

The receiving unit 1710 receives, from an AP, a plurality of channel probe messages having different data rates to be used to select at least one candidate terminal (e.g., the terminal) for the retransmission of the multicast packet. The receiving unit 1710 receives a trigger message informing the at least one candidate terminal of a start of a retransmission period of the multicast packet.

The storage unit 1730 stores a data rate value of at least one decodable channel probe message among the channel probe messages.

The transmission unit 1750 sets a maximum data rate based on the data rate value of the at least one decodable channel probe message.

The control unit 1770 determines the corresponding terminal as the at least one candidate terminal based on whether the maximum data rate corresponds to a data rate of the at least one candidate terminal, the data rate included in the channel probe message. The control unit 1770 controls the transmission unit 1750 to transmit, to the AP, a response message responding to a request message received from the AP in response to the terminal being determined as the at least one candidate terminal. The request message requests terminals to retransmit the multicast packet. The control unit 1770 includes a determination unit 1775. The determination unit 1775 determines whether the channel probe messages include a decodable channel probe message. The control unit 1770 determines whether the terminal is included in a retransmission list of the trigger message. Based on a determination result, the control unit 1770 controls the transmission unit 1750 to retransmit the multicast packet according to a priority of the at least one candidate terminal.

According to the examples described, a multicast packet is retransmitted by at least one candidate terminal rather than by an AP that is a subject of multicasting. Therefore, the multicast packet may be transmitted even beyond a service range of the AP.

Each of the examples of the candidate terminals described for retransmission of a multicast packet are selected according to data rates, and the candidate terminals are sequentially operated according to priority. As a result, multicast packet retransmission efficiency may be increased.

The various units, elements, and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

As a non-exhaustive illustration only, a terminal or device described herein may refer to mobile devices such as, for example, a cellular phone, a smart phone, a wearable smart device (such as, for example, a ring, a watch, a pair of glasses, a bracelet, an ankle bracket, a belt, a necklace, an earring, a headband, a helmet, a device embedded in the cloths or the like), a personal computer (PC), a tablet personal computer (tablet), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, and devices such as a high definition television (HDTV), an optical disc player, a DVD player, a Blue-ray player, a setup box, or any other device capable of wireless communication or network communication consistent with that disclosed herein. In a non-exhaustive example, the wearable device may be self-mountable on the body of the user, such as, for example, the glasses or the bracelet. In another non-exhaustive example, the wearable device may be mounted on the body of the user through an attaching device, such as, for example, attaching a smart phone or a tablet to the arm of a user using an armband, or hanging the wearable device around the neck of a user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A communication method of an access point (AP) for retransmission of a multicast packet in a network comprising the AP and terminals, the communication method comprising:
   determining different data rates to be used to select a candidate terminal;
   transmitting, to the terminals, channel probe messages having the different data rates, wherein each of the channel probe messages includes a data rate, among the different data rates, for selecting the candidate terminal;
   selecting the candidate terminal to be used to retransmit the multicast packet, from the terminals; and
   retransmitting the multicast packet, using the candidate terminal.

2. The communication method of claim 1, wherein the selecting comprises:
   transmitting, to the terminals, a request message requesting the terminals to retransmit the multicast packet.

3. The communication method of claim 2, wherein the request message comprises a message type of the request message, or a size of a contention window to be used in a contention period (CP) in which the candidate terminal contends for the retransmission of the multicast packet, or an expiration timer informing whether the CP is expired, or a virtual carrier sense value notifying other terminals other than the candidate terminal to restrain use of channels, or any combination thereof.

4. The communication method of claim 2, wherein the selecting comprises:
   receiving, from the candidate terminal, a response message responding to the request message; and
   selecting the candidate terminal based on the response message.

5. The communication method of claim 1, further comprising:
   broadcasting, to the terminals, an allocation message informing a result of the selecting.

6. The communication method of claim 5, wherein the allocation message comprises a message type of the allocation message, or an identifier of the candidate terminal, or a priority of the candidate terminal, or any combination thereof.

7. The communication method of claim 1, further comprising:
   determining a priority of the candidate terminal; and
   transmitting, to the candidate terminal, a trigger message comprising information for the retransmission of the multicast packet that is determined based on the priority.

8. A non-transitory computer-readable storage medium storing a program comprising instructions to cause a computer to implement the method of claim 1.

9. The communication method of claim 1, wherein the data rate of the candidate terminal corresponds to any one of the different data rates.

10. A communication method of a terminal for retransmission of a multicast packet in a network comprising an access point (AP) and terminals, the communication method comprising:
receiving, from the AP, channel probe messages having different data rates to be used to select, from the terminals, a candidate terminal to be used to retransmit the multicast packet;
setting a maximum data rate based on a data rate of a decodable channel probe message among the channel probe messages; and
determining the terminal as the candidate terminal based on whether the maximum data rate corresponds to a data rate of the candidate terminal that is included in the decodable channel probe message.

11. The communication method of claim 10, further comprising:
determining whether the channel probe messages comprise the decodable channel probe message.

12. The communication method of claim 10, wherein the channel probe message comprises a message type of the channel probe message, or a data rate of transmitting data included in the channel probe message, or the data rate of the candidate terminal, or a window size used in a contention period of the candidate terminal, or the data, or any combination thereof.

13. The communication method of claim 10, further comprising:
receiving, from the AP, a request message requesting the terminals to retransmit the multicast packet.

14. The communication method of claim 13, wherein the request message comprises a message type of the request message, or a size of a contention window (CW) to be used in a contention period (CP) in which the candidate terminal contends with other candidate terminals for the retransmission of the multicast packet, or an expiration timer informing whether the CP is expired, or a virtual carrier sense value notifying other terminals other than the candidate terminal to restrain use of channels, or any combination thereof.

15. The communication method of claim 14, further comprising:
waiting until the CP is expired, and restraining use of the channels, based on the virtual carrier sense value in response to the terminal being determined as another terminal, other than the candidate terminal.

16. The communication method of claim 14, further comprising:
setting the size of the CW as a CW value of the terminal in response to the terminal being determined as the candidate terminal; and
determining a backoff counter value based on the size of the CW.

17. The communication method of claim 14, further comprising:
transmitting, to the AP, a response message responding to the request message through the contention with the other candidate terminals.

18. The communication method of claim 17, wherein the response message comprises a message type of the response message, or an identifier of the candidate terminal, or status information of the candidate terminal that is determined based on the received request message, or any combination thereof.

19. The communication method of claim 10, further comprising:
receiving, from the AP, an allocation message informing a result of the selecting, the allocation message comprising a message type of the allocation message, or an identifier of the candidate terminal, or a priority of the candidate terminal, or any combination thereof.

20. The communication method of claim 10, further comprising:
receiving, from the AP, a trigger message informing the candidate terminal of a start of a retransmission period of the multicast packet, the trigger message comprising information for the retransmission of the multicast packet that is determined based on a priority of the candidate terminal;
determining whether the terminal is included in a retransmission list of the trigger message; and
retransmitting the multicast packet according to the priority, based on a result of the determining whether the terminal is included in the retransmission list.

21. The communication method of claim 20, wherein the trigger message comprises a message type of the trigger message, or a number of candidate terminals participating in the retransmission of the multicast packet, or an expiration time of the retransmission period of the multicast packet, or a threshold of retransmission power to be used by the candidate terminal to determine whether to retransmit the multicast packet, or threshold activation information indicating whether to use the threshold of the retransmission power, or an ID of the candidate terminal, or a backoff counter value of the candidate terminal, or any combination thereof.

22. The communication method of claim 21, wherein the retransmitting of the multicast packet comprises:
determining whether a channel in which the multicast packet is retransmitted is in an idle state in response to the terminal being determined to be included in the retransmission list; and
retransmitting the multicast packet based on the backoff counter value in response to the channel being determined to be in the idle state.

23. The communication method of claim 22, further comprising:
stopping the retransmission of the multicast packet in response to the channel being determined to be not in the idle state, and transmission power of a currently received packet being greater than or equal to the threshold of the retransmission power.

24. An access point comprising:
a control unit configured to determine different data rates to be used to select a candidate terminal;
a transmission unit configured to transmit, to terminals, channel probe messages having the different data rates, wherein each of the channel probe messages includes a data rate, among the different data rates, for selecting the candidate terminal; and
a selection unit configured to select, from the terminals, the candidate terminal to be used to retransmit a multicast packet, based on a response message transmitted from the candidate terminal based on the channel probe messages.

25. A terminal comprising:
a transmission unit configured to set a data rate of the terminal based on a data rate of a decodable channel probe message among channel probe messages having different data rates, the channel probe messages being received from an access point; and a control unit configured to determine the terminal as a candidate terminal to be used to retransmit a multicast packet based on whether the data rate of the terminal is equal to a data rate of the candidate terminal that is included in the decodable channel probe message.

* * * * *